United States Patent
Mejdrich et al.

(10) Patent No.: US 8,593,459 B2
(45) Date of Patent: Nov. 26, 2013

(54) TREE INSERTION DEPTH ADJUSTMENT BASED ON VIEW FRUSTUM AND DISTANCE CULLING

(75) Inventors: Eric Oliver Mejdrich, Rochester, MN (US); Paul Emery Schardt, Rochester, MN (US); Robert Allen Shearer, Rochester, MN (US); Matthew Ray Tubbs, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 13 days.

(21) Appl. No.: 13/476,876

(22) Filed: May 21, 2012

(65) Prior Publication Data

US 2012/0236001 A1 Sep. 20, 2012

Related U.S. Application Data

(63) Continuation of application No. 12/361,006, filed on Jan. 28, 2009, now Pat. No. 8,243,073.

(51) Int. Cl.
*G06T 15/50* (2011.01)
*G06T 15/00* (2011.01)
*G06T 15/40* (2011.01)
*G06T 15/10* (2011.01)
*G06T 15/20* (2011.01)
*G06T 15/06* (2011.01)

(52) U.S. Cl.
USPC ............ 345/426; 345/419; 345/421; 345/427

(58) Field of Classification Search
None
See application file for complete search history.

(56) References Cited

U.S. PATENT DOCUMENTS

| | | | |
|---|---|---|---|
| 6,148,324 A * | 11/2000 | Ransom et al. | 718/105 |
| 6,222,557 B1 * | 4/2001 | Pulley et al. | 345/622 |
| 7,142,709 B2 | 11/2006 | Girard | |
| 7,164,420 B2 | 1/2007 | Ard | |
| 2008/0043018 A1 | 2/2008 | Keller et al. | |
| 2008/0150944 A1 | 6/2008 | Reshetov et al. | |
| 2008/0192051 A1 | 8/2008 | Fowler et al. | |

OTHER PUBLICATIONS

Hunt, W.; Mark, W.R.; , "Adaptive acceleration structures in perspective space," Interactive Ray Tracing, 2008. RT 2008. IEEE Symposium on , vol., No., pp. 11-17, Aug. 9-10, 2008.*

Hunt, W.; Mark, W.R.; , "Ray-specialized acceleration structures for ray tracing," Interactive Ray Tracing, 2008. RT 2008. IEEE Symposium on , vol., No., pp. 3-10, Aug. 9-10, 2008.*

Hunt, W.; Mark, W.R.; Fussell, D.; , "Fast and Lazy Build of Acceleration Structures from Scene Hierarchies," Interactive Ray Tracing, 2007. RT '07. IEEE Symposium on, vol., No., pp. 47-54, Sep. 10-12, 2007.*

(Continued)

*Primary Examiner* — Kee M Tung
*Assistant Examiner* — Zhengxi Liu
(74) *Attorney, Agent, or Firm* — Toler Law Group

(57) ABSTRACT

A computer-implemented method includes initializing a driver associated with an input/output adapter in response to receiving an initialize driver request from a client application. The computer-implemented method includes initializing the input/output adapter to enable adapter capabilities of the input/output adapter to be determined. The computer-implemented method also includes determining the adapter capabilities of the input/output adapter. The computer-implemented method further includes determining slot capabilities of a slot associated with the input/output adapter. The computer-implemented method also includes setting configurable capabilities of the input/output adapter based on the adapter capabilities and the slot capabilities.

25 Claims, 4 Drawing Sheets

(56) References Cited

OTHER PUBLICATIONS

Venkatraman Govindaraju, Peter Djeu, Karthikeyan Sankaralingam, Mary Vernon, and William R. Mark. 2008. Toward a multicore architecture for real-time ray-tracing. In Proceedings of the 41st annual IEEE/ACM International Symposium on Microarchitecture (MICRO 41).*

Wald, I.; , "On fast Construction of SAH-based Bounding Volume Hierarchies," Interactive Ray Tracing, 2007. RT '07. IEEE Symposium on , vol., No., pp. 33-40, Sep. 10-12, 2007.*

Stoll, G.; Mark, W.R.; Djeu, P.; Wang, R.; and Elhassan, I.; 2006. Razor: An architecture for dynamic multiresolution ray tracing. Tech. rep. 06-21, Department of Computer Science, University of Texas at Austin.

* cited by examiner

TREE INSERTION DEPTH ADJUSTMENT BASED ON VIEW FRUSTUM AND DISTANCE CULLING

I. CLAIM OF PRIORITY

This application is a continuation patent application of, and claims priority from, U.S. patent application Ser. No. 12/361,006, filed on Jan. 28, 2009 now U.S. Pat. No. 8,243,073 and entitled "Tree Insertion Depth Adjustment Based on View Frustrum and Distance Culling," which is incorporated by reference herein in its entirety for all purposes.

II. FIELD OF THE DISCLOSURE

The present invention relates generally to image processing, and more particularly, to updating an acceleration data structure (ADS) used in a ray tracing operation.

III. BACKGROUND

Ray tracing has become mainstream in video game animation, motion picture and other media applications. Ray tracing describes a technique for synthesizing photorealistic images by identifying and summing paths connecting light sources with cameras. Rays are traced along the line of sight to determine visibility and from light sources to determine illumination.

A ray generally originates at a point in space described by a position vector and travels along a direction vector. Ray tracing is used in computer graphics to determine visibility by directing the ray from the origin along a line of sight described by the direction vector. The ray is tested for intersection against geometry within a virtual scene to determine the nearest visible surface along that line of sight.

Ray tracing generates an image by tracing the ray through pixels in a plane. The technique is capable of producing a very high degree of photorealism, usually higher than that of typical scanline rendering methods. Ray tracing is capable of simulating a wide variety of optical effects such as reflection and refraction, as well as scattering and chromatic aberration. Scenes may incorporate data from images and models captured by digital photography.

Such scenes in ray tracing are described mathematically by a programmer or visual artist using intermediary tools. For example, most ray tracing processes use an ADS, such as a k-dimensional tree (kd-tree), to generate three-dimensional images. A kd-tree may include empty leaf nodes that correspond to empty bounding volumes within a three-dimensional scene. A bounding volume may comprise a logically divided portion of the scene. A ray tracing algorithm may recursively split the scene by axis-aligned planes. Initially, the scene may be split in two by such a plane. Each resultant half may then be split again along some other plane(s). This results in a hierarchical organization of the kd-tree structure. Each level of the structure may be recursively traversed to determine where the next level of the tree may be found.

The leaf nodes of a kd-tree may include a small axis aligned cell that includes some number of polygons, or primitives. At the next level up the tree, each node represents an axis aligned box that is completely filled by some preset number of leaf nodes. As such, a split-plane splits the larger volume into the smaller leaf cells. At the next level, each node represents an axis aligned box completely filled by the lower level nodes using a similar split-plane. At any given level, a ray may be intersected against the bounding volumes to determine whether the ray misses, hits, refracts and/or reflects from an object.

Each ray is typically tested for intersection with some subset of all the objects in the scene. Once the nearest object has been identified, the algorithm will estimate the incoming light at the point of intersection and examine the material properties of the object. This information may be combined to calculate the final color of the pixel. Certain illumination algorithms and object materials may require more rays to be re-cast into the scene.

Despite the utility of ray tracing, current ray tracing techniques suffer from a number of known limitations and weaknesses. For example, algorithms used to build the ADS may experience slow setup of an ADS, as well as require relatively large amounts of processing and memory. These computing resources are thus unavailable to other aspects of a scene rendering processes. In some cases, more time may be spent building a tree than rendering the image. There are consequently diminishing returns for intelligently building an ADS.

Such challenges are exacerbated where view frustum culling should be used. View frustum culling is a process of removing objects that lie completely outside the viewing frustum from the rendering process. The frustum is the region of space in the modeled world that may appear on the screen, i.e., the field of view of the notional camera. Rendering these outlying objects might waste processing since they are not directly visible. Unlike with rasterization, view frustum culling in ray tracing is complicated because objects outside the viewing frustum may be visible when reflected off an object inside the frustum. To make culling fast, it usually must be accomplished using bounding volumes surrounding the objects rather than the objects themselves. The process remains relatively complex and often requires undesirable amounts of processing resources, which can burden the system.

There is consequently a need for an improved manner of rendering an image using ray tracing processes.

IV. SUMMARY

The present invention provides an improved computer implemented method, apparatus and program product for rendering an image using ray tracing. Embodiments consistent with the invention may build an ADS having a plurality of nodes corresponding to a plurality of bounding volumes comprising divided portions of image data by in part determining a distance between a bounding volume of the plurality of bounding volumes and a reference. Aspects of the invention may modify the size of the bounding volume according to the distance. The ADS may be used to render the image.

The bounding volume may be generated with a size that is generally proportional to the distance. Embodiments may determine that a primitive is a first primitive to be included within a node corresponding to the bounding volume. Where applicable, aspects of the invention may subdivide the node corresponding to the bounding volume. A leaf node threshold associated with the subdivided node may be generated.

The distance may be determined by measuring the distance between the bounding volume and a reference comprising a point in the image data. An exemplary point may comprise a portion of a ray. The distance may alternatively be determined by measuring the distance between the bounding volume and the ray origin. In still another embodiment, the distance may be measured from the bounding volume in relation to the frustum. The above steps may be repeated in response to receiving another frame comprising other image data. This other frame may be a next occurring frame.

Aspects of the invention may determine whether to include a primitive in a node corresponding to the bounding volume according to the distance. The size of the bounding volume may be modified according to historical performance data. The same or another embodiment may determine whether to include a primitive in a node corresponding to the bounding volume according to historical data concerning a ray intersection. Such a node will typically comprise a leaf node. A leaf node corresponding to the bounding volume may be subdivided based on historical data concerning ray intersections. Embodiments may determine that a primitive is used for a secondary ray. The primitive may be excluded from a node corresponding to the bounding volume based upon the determination.

Aspects of the invention may modify the size of the bounding volume according to a number of rays directed into the bounding volume. Load balancing of the plurality of bounding volumes may be accomplished according to an allocated, desired or otherwise available processing resource. Aspects of the invention may be implemented using a highly threaded network on a chip. Embodiments may further employ a heuristic algorithm to modify the size of the bounding volume according to the distance.

A method consistent with the invention may transform data to produce an ADS having a plurality of nodes corresponding to a plurality of bounding volumes comprising divided portions of image data. Aspects of the invention may include determining a distance between a bounding volume of the plurality of bounding volumes and a reference. An embodiment may modify according to the distance a number of primitives placed into a node of the acceleration data structure that corresponds to the bounding volume. The number may range from one to nearly any plurality.

The distance may be determined by measuring a distance between a reference and an object included within the bounding volume. Aspects of the invention may modify the number of primitives to be in general proportion to the distance. The number of primitives may be determined by setting according to the distance a leaf node threshold for the node. Some embodiments may use historical performance data to determine whether to include a primitive in the node according to historical performance data.

Another aspect of the invention may include an apparatus comprising a memory configured to store image data logically divided into a plurality of bounding volumes. The memory may also include an ADS having nodes that correspond to the plurality of bounding volumes. A processor in communication with the memory may be configured to generate a ray that travels through the image data from a ray origin. The processor may further be configured to modify a size of a bounding volume of the plurality according to a distance measured from a reference point to the bounding volume.

Another embodiment may include an apparatus comprising a memory configured to store image data logically divided into a plurality of bounding volumes and an ADS having nodes that correspond to the plurality of bounding volumes. A processor in communication with the memory may be configured to generate a ray that travels through the image data from a ray origin. The processor may be further configured to modify a number of primitives placed into a node of the ADS according to a distance measured from a reference point to the bounding volume. The node may correspond to a bounding volume of the plurality.

An aspect of the invention may include a program product comprising program code configured to conduct ray tracing with image data logically divided into a plurality of bounding volumes. The program code may modify a number of primitives placed into a node of an ADS according to a distance measured from a reference point to the bounding volume. The node may correspond to a bounding volume of the plurality. The program product may further include a computer readable medium bearing the program code.

These and other advantages and features that characterize the invention are set forth in the claims annexed hereto and forming a further part hereof. However, for a better understanding of the invention, and of the advantages and objectives attained through its use, reference should be made to the Drawings and to the accompanying descriptive matter in which there are described exemplary embodiments of the invention.

V. BRIEF DESCRIPTION OF THE DRAWINGS

VI. DETAILED DESCRIPTION

Embodiments may build an efficiently balanced ADS or other tree structure based on view frustum and distance culling. Aspects of the invention may conduct ray tracing operations where the rendering compute requirement is reduced by varying the size of bounding volumes into which image data is divided. Another or the same embodiment may vary a number of primitives included within nodes of an acceleration data structure that correspond to the bounding volumes.

Aspects of the invention may rebuild a tree structure every frame to allow frame-to-frame optimization of leaf nodes in a highly threaded network on a chip processor. Where so configured, the amount of geometry in each leaf node may be based on a spatial distance from a reference point. For instance, the number of primitives in the nodes may depend upon their distance from the center of the view frustum to outlying boundaries of the bounding volume. Another or the same embodiment may determine the geometry in a node based upon if the primitives lie outside of the view frustum and are only needed for reflected rays and shadows.

The size of the bounding volumes of an embodiment may increase by some function the farther it is away from the view frustum or the eye point. The bounding volume size and/or number of primitives per node may also be weighted based on past performance. The above size and/or number may also be determined by the number of rays shot in the bounding volume direction. The size of bounding volumes may be determined using load balancing processes based upon the amount of available computing resources. Past data and heuristics may be used to direct primitives most efficiently to appropriate bounding volumes and associated nodes. Historical data associated with ray intersections with leaf nodes may be used to determine the number of primitives per node. Such historical intersection data may alternatively or additionally be used to subdivide leaf nodes.

Figure 1:
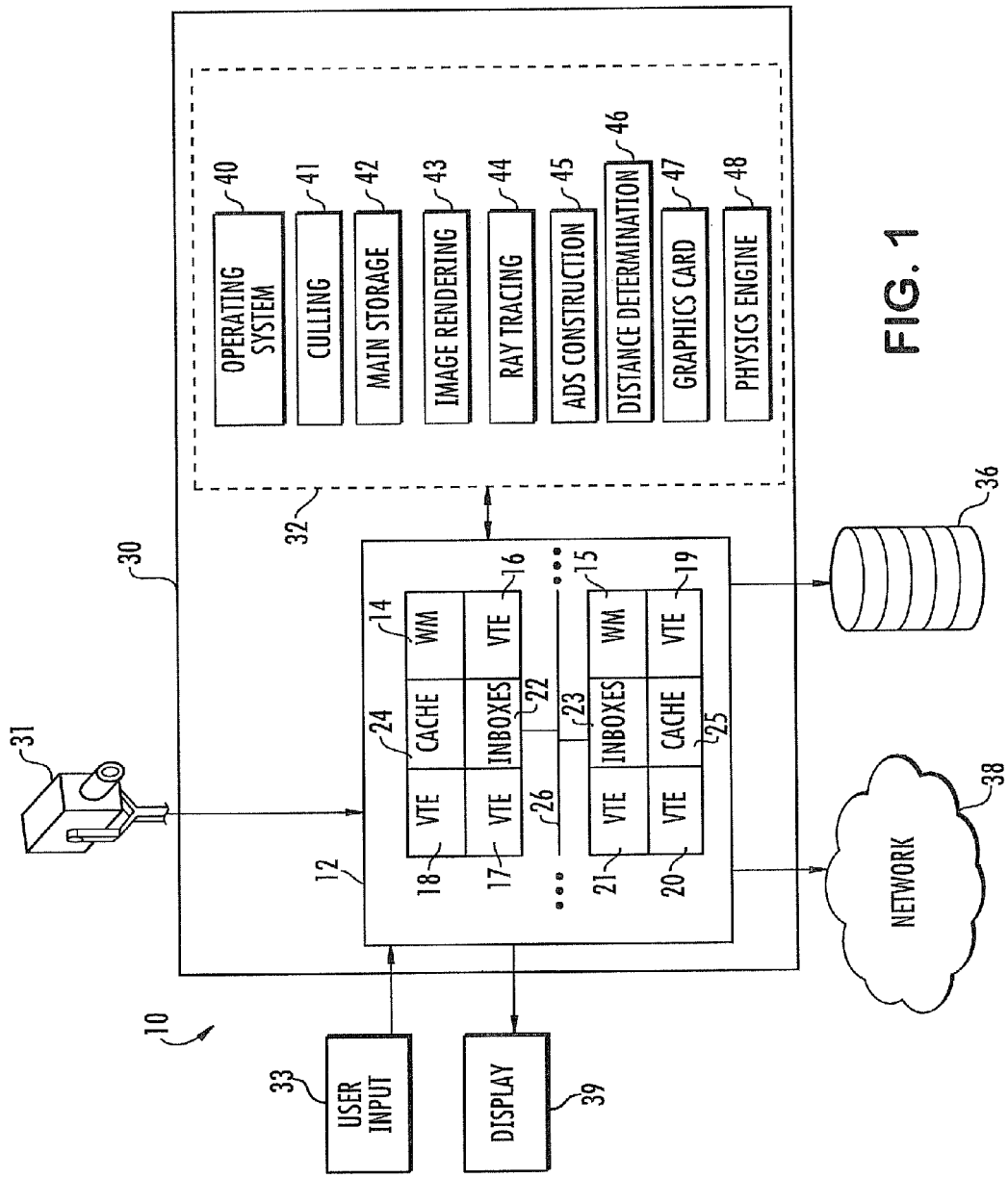
FIG. 1 shows a block diagram of a networked computer system configured to construct an ADS based upon a distance of a primitive and/or bounding volume from a reference in accordance with the underlying principles of the present invention.

While the principles of this invention do not limit its forum or application, one image rendering embodiment capitalizes on the structure available through the system 10 exemplified in FIG. 1. FIG. 1 generally shows a block diagram of a networked computer system 10 configured to optimize ADS construction in terms of distance culling. The system 10 more particularly comprises one or more client computer(s) 30 coupled to a network 38. Network 38 represents a networked interconnection, including, but not limited to, local area, wide area, wireless, and public networks (e.g., the Internet). Moreover, any number of computers and other devices may be networked through network 38, e.g., multiple servers.

Computer system 10 will hereinafter also be referred to as an "apparatus," "computer," "tool," "device," or just "system," although it should be appreciated that the terms may respectively include many other controller configurations. Moreover, while only one network interface device is shown in FIG. 1, any number of computers and other devices may be networked through network 38. In still another embodiment, the system 10 may be implemented in a standalone configuration, i.e., disconnected from another computer or computer network.

Computer 30 typically includes at least one processor 12 coupled to a memory 32. Processor 12 may represent one or more processors (e.g., central processing units, microprocessors). More specifically, the processor 12 of FIG. 1 includes a multiple core processing element. Memory 32 may represent the SRAM devices comprising the main storage 42 of computer device 30, as well as any supplemental levels of memory, e.g., cache memories, non-volatile or backup memories (e.g., programmable or flash memories), read-only memories, etc. In addition, memory 32 may be considered to include memory storage physically located elsewhere in computer device 30, e.g., any cache memory present in processor 41, as well as any storage capacity used as a virtual memory, e.g., as stored within a database, or on another computer coupled to computer device 30 via network 38.

Computer device 30 also may receive a number of inputs and outputs for communicating information externally. For interface with a user, computer device 30 typically includes one or more input devices 33 (e.g., a keyboard, a mouse, a trackball, a joystick, a touch pad, iris/fingerprint scanner, and/or a microphone, among others). The computer device 30 additionally includes a display 39 (e.g., a CRT monitor, an LCD display panel, and/or a speaker, among others). It should be appreciated, however, that with some implementations of the computer device 30, direct user input and output may be unsupported by the computer, and interface with the server computer device 30 may be implemented through a computer or workstation networked with the computer device 30. As shown in FIG. 1, the system includes a camera 31 that may be used to capture images comprising the subject of a ray tracing operation.

For additional storage, the system 10 may also include one or more mass storage devices 36 configured to store, for instance, the film, animation or other image data. Exemplary devices 36 may include: a floppy or other removable disk drive, a flash drive, a hard disk drive, a direct access storage device (DASD), an optical drive (e.g., a CD drive, a DVD drive, etc.), and/or a tape drive, among others. Furthermore, computer device 30 may include an interface with one or more networks (e.g., a LAN, a WAN, a wireless network, and/or the Internet, among others) to permit the communication of information with other computers coupled to the network 38. It should be appreciated that computer device 30 typically includes suitable analog and/or digital interfaces between processor 12 and each of components 32, 33, 36, 38 and 39.

Computer device 30 may operate under the control of an operating system 40, and may execute various computer software and hardware applications, components, programs, or modules. For instance, the system 10 may include a culling algorithm 41, a main memory storage 42, an image rendering algorithm 43 and a ray tracing program 44. Other program code may include an ADS construction algorithm 45, a distance determination program 46, a graphics card program code 47 and a physics engine 48. The image rendering program 43 may generally be used to create the image and may affect variables such as shadow quality, depth of recursion and sampling rates. The ray tracing program 44 may generally assist in image generation by tracing paths of light through pixels in an image plane. The graphics card program code 47 is typically executed by a video card, also known as a graphics accelerator card, display adapter, or graphics card, and functions to generate and output images to a display.

The ADS construction algorithm 45 may be used to generate a spatial index or other ADS used by the image rendering and/or ray tracing programs 43, 44. Spatial indexes are generally used by spatial databases to optimize spatial queries. Indexes used by non-spatial databases may be unable to effectively handle features such as how far two points differ and whether points fall within a spatial area of interest. Common spatial index methods include: grid, z-order, quadtree, Octree, UB-tree, R-tree, and kd-tree.

The distance determination program 46 may determine the distance between a reference and bounding volume or primitive. The reference may include a ray origin, i.e., an eye point, or a point within the image data. Such a point may comprise a portion of a ray. A reference of another embodiment may include a ray. Still another reference may comprise a view frustum or boundary of a frustum.

The physics engine 48 may comprise an application that simulates real world physical phenomena as applied to objects within a three-dimensional scene. The physics engine 48 may be used to simulate and predict the effects of physical phenomena on a frame-to-frame basis. For example, the physics engine 48 may perform position updates for an object if the object is moving, and may perform collision detection tests to determine if an object collides with any other objects within the three-dimensional scene. According to one embodiment of the invention, the physics engine 48 may use multiple threads on a multiple core processing element to perform physics related calculations.

The processor 12, e.g., multiple core processing element, may include a plurality of basic throughput engines (BTEs). A BTE may comprise a plurality of processing threads and a core cache, such as a Level 1 (L1) cache. As shown in FIG. 1, the threads of the BTEs are assigned to or otherwise comprise workload managers 14, 15 and vector throughput engines 16, 17, 18, 19, 20, 21. A workload manager 14, 15 generally traverses an ADS with a ray issued by the system 10. As described herein, an ADS may be implemented as a tree type data structure used to divide a relatively large three-dimensional scene into smaller bounding volumes. The system 10 may use ray tracing and the ADS to quickly determine ray-bounding volume intersections. In one embodiment of the invention, the workload manager may perform ray-bounding volume intersection tests by using the ADS.

A vector throughput engine 16, 17, 18, 19, 20, 21 generally determines if a ray intersects a primitive contained within a bounding volume. Subsequent to the workload manager 14, 15 determining a ray-bounding volume intersection, the workload manager 14, 15 may use inboxes 22, 23 to send the ray to a vector throughput engine 16, 17, 18, 19, 20, 21. The vector throughput engine 16, 17, 18, 19, 20, 21 may then determine if the ray intersects a primitive contained within the bounding volume. The vector throughput engines 16, 17, 18, 19, 20, 21 may also perform operations relating to determining the color of the pixel through which the ray passed. The processing threads assigned to the workload managers 14, 15 and vector throughput engines 16, 17, 18, 19, 20, 21 may access a shared multiple core processing element memory cache 24, 25. The memory caches 24, 25 may comprise a Level 2 (L2) cache.

As discussed herein, the workload managers 14, 15 and vector throughput engines 16, 17, 18, 19, 20, 21 may also access inboxes 22, 23. The inboxes 22, 23 may comprise memory mapped address space. As such, the inboxes 22, 23 may be mapped to the processing threads located within each one of the BTEs. Each thread of the workload managers 14, 15 and vector throughput engines 16, 17, 18, 19, 20, 21 may include a memory mapped inbox and access to all of the other memory mapped inboxes 22, 23. The inboxes 22, 23 may comprise a low latency and a high bandwidth communications network used by the workload managers 14, 15 and vector throughput engines 16, 17, 18, 19, 20, 21.

The workload managers 14, 15 and vector throughput engines 16, 17, 18, 19, 20, 21 may use the inboxes 22, 23 as a network to communicate with and to redistribute data processing work amongst each other. In another embodiment, separate outboxes may be used in the communications network. For example, processing results may be received by separate outboxes. Where so configured, inboxes 22, 23 may also serve as outboxes. For example, workload managers 14, 15 may write the results of a processing function directly to the inbox 22, 23 of a vector throughput engine 16, 17, 18, 19, 20, 21 that will use the results.

The workload managers 14, 15 and vector throughput engines 16, 17, 18, 19, 20, 21 may partition and redistribute work to enhance overall system performance. Although only two units are shown in the processor 12, a system 10 that renders millions of primitives, per frame may include many such units.

FIG. 1 also shows a high speed bus 26 that enables workload managers 14, 15 to collect and distribute image processing related tasks to other workload managers 14, 15 and/or vector throughput engines 16, 17, 18, 19, 20, 21 of other units. Similarly, the bus 26 may enable each of the vector throughput engines 16, 17, 18, 19, 20, 21 to communicate with other vector throughput engines 16, 17, 18, 19, 20, 21 or the workload managers 14, 15.

The communication using the bus 26 may be accomplished without burdening the caches 24, 25 with data packets. Memory space from the caches 24, 25 may be allocated to the inboxes 22, 23. An inbox 22, 23 may be assigned to a thread. Where desired, inbox memory may be exclusively assigned to the thread. The inbox 22, 23 may maintain the thread's data and instructions in the assigned inbox portion of the cache 24, 25. Threads may use the inboxes 22, 23 to communicate with each other. Where one thread has data and/or instructions that are to be provided to another thread for an inbox 22, 23, the other thread may send the data and/or instructions to the inbox 22, 23. In one embodiment of the invention, memory space within an inbox 22, 23 may be mapped to a global memory address.

Embodiments may assign portions of the cache 24, 25 to the inboxes 22, 23 in order to create a low latency and high bandwidth communications network. The remaining portion of the cache 24, 25 may be unassigned and available to store information. Such information may comprise geometry and data structures used in ray tracing that may otherwise be unrelated to communications between processing threads. By using the inboxes 22, 23 for communications between processing threads and using the remaining portion of the cache 24, 25 to store geometry and data structures, data that is likely to be reused when tracing subsequent rays or rendering subsequent frames may remain in the cache 24, 25. Data that is unlikely to be reused when tracing subsequent rays or rendering subsequent frames, such data processing work, may not remain in the cache 24, 25.

Program code used by embodiments of the invention may include heuristics. A heuristic algorithm generally may ignore whether the solution to the problem can be proven to be correct, but usually produces a good solution or solves a simpler problem that contains or intersects with the solution of the more complex problem. For instance, a heuristic algorithm may process historical, real time, predicted or other performance data to determine that a particular object of interest is never intersected. Heuristics may be used to determine the number of primitives per node based upon the distance of the primitive and/or bounding volume from the reference.

Embodiments may utilize Network-on-a-chip (NoC) technology. NoC-based systems can accommodate multiple asynchronous clocking used by many System-on-a-chip designs. The NoC solution brings a networking method to on-chip communication and brings notable improvements over conventional bus systems.

As discussed herein, certain embodiments consistent with the invention include microprocessors to execute multiple threads in parallel, effectively providing many of the same performance gains attainable through the use of multiple microprocessors. Embodiments may further include a number of computer software and hardware technologies to facilitate additional parallel processing. From a software standpoint, multithreaded operating systems and kernels have been developed that permit computer programs to concurrently execute in multiple threads to concurrently perform multiple tasks. Threads generally represent independent paths of execution for a program.

In general, the routines executed to implement the embodiments of the invention, whether implemented in hardware, as part of an operating system, or as a specific application, component, program, engine, process, programmatic tool, object, module, or sequence of instructions, or even a subset thereof, may be referred to herein as an "algorithm," "function," "program code," or simply "program." Program code typically comprises one or more instructions that are resident at various times in various memory and storage devices in a computer, and that, when read and executed by one or more processors in a computer, cause that computer to perform the steps necessary to execute steps or elements embodying the various aspects of the invention. One of skill in the art should appreciate that embodiments consistent with the principles of the present invention may nonetheless use program code resident at only one or at any number of locations.

Moreover, while the invention has and hereinafter will be described in the context of fully functioning computer systems, those skilled in the art will appreciate that the various embodiments of the invention are capable of being distributed as a program product in a variety of forms, and that the invention applies equally regardless of the particular type of computer readable, signal bearing media used to actually carry out the distribution. Examples of signal bearing, computer readable media include, but are not limited to tangible, recordable type media such as volatile and non-volatile memory devices, floppy and other removable disks, hard disk drives, magnetic tape, optical disks (e.g., CD ROMs, DVDs, etc.), among others, and transmission type media such as digital and analog communication links.

In addition, various program code described hereinafter may be identified based upon the application or engine within which it is implemented in a specific embodiment of the invention. However, it should be appreciated that any particular program nomenclature that follows is used merely for convenience, and thus the invention should not be limited to use solely in any specific application or engine identified and/or implied by such nomenclature.

Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the invention is not limited to the specific organization and allocation of program functionality described herein.

The various software components and resources illustrated in FIG. 1 may be implemented in a number of manners, including using various computer software applications, routines, components, programs, objects, modules, data structures and programs. Those skilled in the art will further recognize that the exemplary environments illustrated in FIG. 1 are not intended to limit the present invention. Indeed, those skilled in the art will recognize that other alternative hardware and/or software environments may be used without departing from the scope of the invention.

Figure 2:
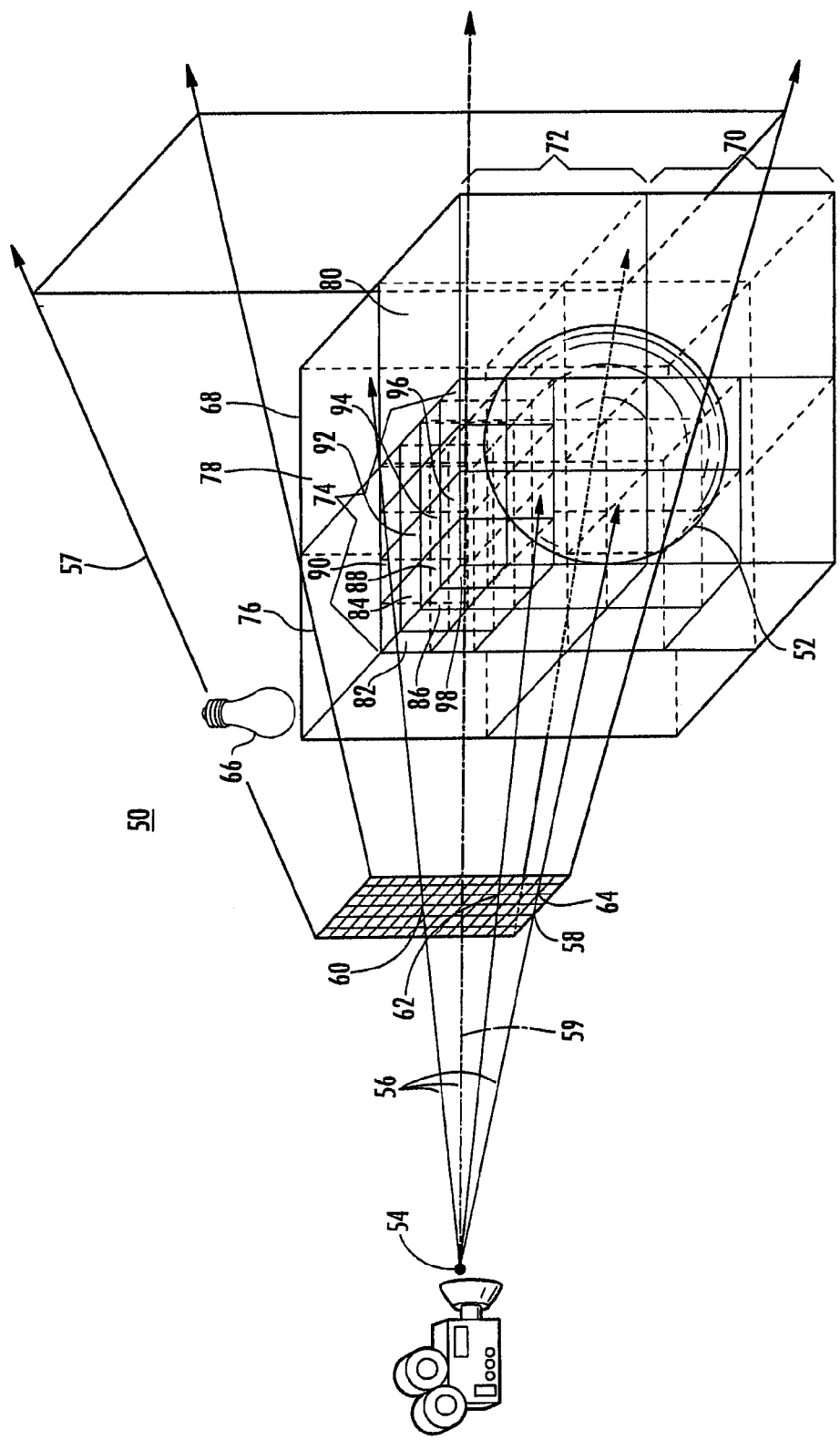
FIG. 2 shows a logical representation of a ray casting operation and virtual environment in accordance with the underlying principles of the present invention.

FIG. 2 shows a logical representation of a ray casting operation and virtual environment 50 in accordance with the underlying principles of the present invention. The environment 50 more particularly shows bounding volumes having sizes that vary according to their respective distances from a reference. The environment 50 includes an object 52 viewed by the eye of an observer as represented by ray origin 54. As such, the origin 54 may be associated with a camera viewpoint for a given frame.

Rays 56 extending from ray origin 54 may represent a perspective view of the object 52. The rays 56 may have properties and behavioral qualities analogous to light rays. The rays 56 may intersect a pixel plane 58 comprising multiple pixels. A pixel, or picture element, generally comprises the smallest piece of information in an image. Pixels are normally arranged in a two-dimensional grid. Each pixel is a sample of an original image and may include color components. The three-dimensional virtual environment 50 may be rendered into a two-dimensional picture by the image processing system 10. The resultant two-dimensional picture may be projected onto a monitor display 39. The display 39 may use many pixels of different colors to render the final two-dimensional picture.

As shown in FIG. 2, a ray 56 may traverse the virtual environment 50 and pixel plane 58, where the final two-dimensional picture will be rendered by the image processing system 10. As shown in FIG. 2, pixels 60, 62, 64 represent intersections of rays 56 from the ray origin 54.

The object 52 comprises part of an exemplary three-dimensional scene to be rendered by an image processing system 10. While only a sphere is shown in FIG. 2 for instructional purposes, objects typically are numerous and include different geometric shapes. Objects are often broken up into smaller geometric shapes (e.g., squares, circles, triangles, etc.). The larger objects are then represented by a number of the smaller simple geometric shapes. These smaller geometric shapes are often referred to as primitives.

As shown in FIG. 2, the object 52 and the surrounding space may be divided into one or more bounding volumes. As discussed herein, a large bounding volume 68 may correspond to a first node of an ADS. The space may be divided into smaller portions. For instance, bounding volumes 70 and 72 may subdivide the bounding volume 68. Subdivided volumes 70 and 72 may further be divided into other bounding volumes 74, 76, 78, 80 roughly corresponding to a quarter of the original cube. As shown in FIG. 2, one of those bounding volumes 74 may be further logically subdivided into smaller sections 82, 84, 86, 88, 90, 92, 94, 96, 98. One of skill in the art will recognize that the virtual space may be divided in any ratio according to any known scheme or ADS algorithm.

According to an embodiment consistent with the present invention, the relative sizes of the bounding volumes may be modified according to their respective distances from a reference. For instance, the ray origin 54 may comprise an exemplary reference. As discussed herein, other suitable references may include a point within the image data. Such a point may comprise a portion of a ray. A reference of another embodiment may include a ray 59, itself, e.g. corresponding to the center of the frustum 57. Still another reference may comprise a view frustum 57 or boundary of a frustum 57. Bounding volumes 82, 84, 86, 88, 90, 92, 94, 96 closest to the reference may be smaller than bounding volumes 52, 70 having greater distances between the reference.

The view frustum 57 may include the region of space in the modeled world that may appear on the screen. The frustum 57 may represent the field of view of the notional camera. The exact shape of this region varies depending on what kind of camera lens is being simulated, but typically it is a frustum of a rectangular pyramid. The planes that cut the frustum perpendicular to the viewing direction are called the near plane and the far plane. Objects closer to the ray origin 54 than the near plane or beyond the far plane may not be drawn.

FIG. 2 also shows a light source 99. The light source 99 may illuminate the object 52. Depending on the location of the light sources 99 and the object 52, the light source 99 may cause shadows to be cast onto other objects (not shown) within the scene.

The pixel plane 58 may include millions of pixels. Each individual pixel may display a different color to render the final composite two-dimensional picture on the display 39. The ray tracing algorithm 44 may calculate the colors that the issued rays 56 encounter in the environment 50. The image processing system 10 may assign the colors encountered by the ray to the pixel 60, 62, 64 through which the ray 56 passed on its way from the origin 54a to the object 52 or other portion of the three-dimensional scene. Where a number of rays intersect a pixel, the color of the pixel may be determined by each color contribution from all of the rays that were issued for the pixel. Other pixels may only have a single ray issued to determine the resulting color of the pixel in the two-dimensional picture. Some pixels may not have any rays issued by the image processing system, in which case their color may be determined, approximated or assigned by algorithms within the image processing system. For example, if a ray does not intersect an object within the scene it may be assigned a default background color, e.g., approximating the color of the sky.

Many factors may contribute to the color of the object struck by the ray 56. For example, light sources within the three-dimensional scene may illuminate the object. Furthermore, physical properties of the object may contribute to the color of the object. For example, if the object is reflective or transparent, other non-light source objects may then contribute to the color of the object.

In order to determine the effects from other objects within a three-dimensional environment, secondary rays may be issued from the point where the original ray 56 intersected the object 52. For example, one type of secondary ray may be a shadow ray. A shadow ray may be used to determine the contribution of light to the point where the original ray 56 intersects the object.

Another type of secondary ray may be a transmitted ray. A transmitted ray may be used to determine what color or light may be transmitted through the body of the object 52. A transmitted ray may be issued by the image system 10 if the object with which the original ray intersected has transparent or translucent properties. For instance, the obstructing object may comprise glass. A transmitted ray traverses through the object at an angle relative to the angle at which the original ray struck the object.

Furthermore, a third type of secondary ray may be a reflected ray. A reflected ray may be used to determine what color or light is reflected onto the object. If the object with which the original ray intersected has reflective properties, like metal, then a reflected ray may be issued to determine what color or light may be reflected by the object. Reflected rays traverse away from the object at an angle relative to the angle at which the original ray intersected the object.

A shadow ray may be traced from the point of intersection of the original ray 56 and the object 52 to the light source 66. Should the ray reach the light source without encountering another object before the ray reaches the light source, the light source 66 may illuminate the object 52 struck by the original ray 56 at the point where the original ray struck the object 52. Other shadow rays may have their path between the point where the original ray struck the object and the light source is blocked by another object (not shown). If the obstructing object is opaque, then the light source will not illuminate the object at the point where the original ray struck the object. Thus, the light source may not contribute to the color of the original ray. However, if the object is translucent or transparent, the light source may illuminate the object at the point where the original ray struck the object.

The total contribution of color and light of all secondary rays (e.g., shadow rays, transmitted rays, reflected rays, etc.) may contribute to the final color of the pixel through which the original ray passed.

Figure 3:
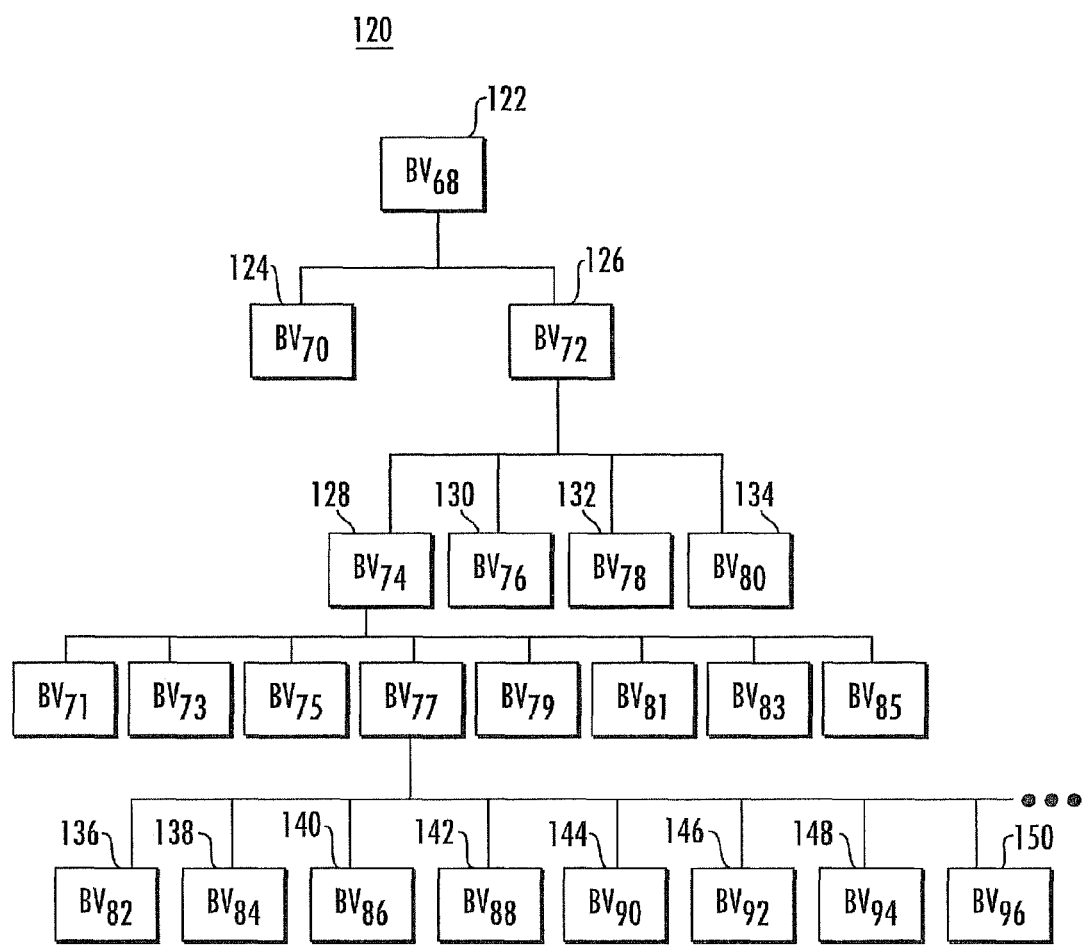
FIG. 3 shows an ADS that may be generated using the ray casting operation structure of FIG. 3 and that generally corresponds to the environment of FIG. 2.

FIG. 3 shows an ADS 120 that roughly corresponds to one that may be generated using the ray casting operation structure of FIG. 3. More particularly, node 122 of the ADS 120 generally corresponds to bounding volume 68 of FIG. 2. Bounding volumes 70, 72 of FIG. 2 may be represented generally by nodes 124, 136 of FIG. 3. Accordingly, nodes 128, 130, 132, 134 of FIG. 3 respectively correspond to bounding volumes 74, 76, 78, 80 of FIG. 2. As shown in FIG. 3, leaf nodes 136, 138, 140, 142, 144, 146, 148, 150 roughly correspond to the smallest bounding volumes 82, 84, 86, 88, 90, 92, 94, 96 of FIG. 2.

An ADS 120 may be useful in quickly and efficiently determining if an issued ray 56 intersects any objects 52 within the scene to be rendered. The ADS 120 may divide a three-dimensional scene or world into relatively smaller volumes that may or may not include primitives. An image processing system 10 may then use the known boundaries of these smaller volumes to determine if a ray may intersect primitives contained within the smaller volumes. If a ray 56 does intersect a volume containing primitives, then a ray intersection test may be run using the trajectory of the ray 56 against the known location and dimensions of the primitives contained within that volume.

If a ray 56 alternatively does not intersect a particular volume, then there may be no need to run ray-primitive intersection tests against the primitives contained within that volume. Furthermore, if a ray intersects a bounding volume that does not contain primitives, then there may not be a need to run ray-primitive intersections tests against that bounding volume. Thus, by reducing the number of ray-primitive intersection tests that may be necessary, the use of a spatial index greatly increases the performance of a ray tracing image processing system 10. Some examples of different spatial index ADS' include octrees, kd-trees, and binary space partitioning trees (BSP trees). While several different ADS' exist, for ease of describing embodiments of the present invention, a kd-tree will be used in the examples to follow. However, those skilled in the art should recognize that embodiments of the invention may be applied to any of the different types of other ADS'.

Some cost function in a kd-tree may be used to recursively split the scene by axis-aligned planes. Initially, the scene may be split in two by a plane. Each half may then be split again along some other plane, and the process may repeat. This technique may result in a hierarchical organization of the structure. Each level of the kd-tree may be recursively traversed to determine where the next level of the structure may be found. Cost functions may be carefully selected in the construction phase of these structures to achieve optimum performance while traversing these trees.

Described another way, a kd-tree uses axis aligned bounding volumes to partition the entire space into smaller volumes. That is, the kd-tree may use splitting planes to divide a three-dimensional space into smaller bounding volumes. Together the smaller bounding volumes make up the entire space in the scene. The determination to partition, or divide, a larger bounding volume into two smaller bounding volumes may be made by the image processing system 10 using the ADS construction algorithm 45.

Embodiments of the present invention may determine when to partition using distance determination information. One criterion for determining when to partition a bounding volume into smaller volumes may be the number of primitives contained within the bounding volume. That is, as long as a bounding volume contains more primitives than a predetermined leaf node threshold, the ADS construction algorithm 45 may continue to divide volumes by drawing more splitting planes. Another criterion for determining when to partition a bounding volume into smaller volumes may be the amount of space contained within the bounding volume. Furthermore, a decision to continue partitioning the bounding volume may also be based on how many primitives may be intersected by the plane that creates the bounding volume.

Turning more particularly to FIG. 3, the ADS 120 may comprise a binary structure representing the partitioning of the scene/environment 50. The binary tree structure of the ADS 120 comprises nodes, branches and leaves. For instance, internal node 126 within the ADS 120 may represent a relatively large bounding volume 72. Node 126 may contain branches to sub-nodes 128, 130, 132, 134 that may respectively represent four relatively smaller partitioned volumes 74, 76, 78, 80. These bounding volumes 74, 76, 78, 80 result after a partitioning of the relatively large bounding volume 72 by a splitting plane.

In an axis-aligned kd-tree, each internal node may include branches to other nodes. An internal node may store information such as pointers to leaf nodes, as well as where along which axis the splitting plane was drawn. In one arrangement, the internal node may include branches (i.e., pointers) to leaf nodes. A leaf node 136 is a node that is not further sub-divided into smaller volumes and contains pointers to primitives. An internal node may also contain branches to other internal nodes that are further sub-divided. An internal node may also include the information needed to determine along what axis the splitting plane was drawn and where along the axis the splitting plane was drawn.

The ADS construction algorithm 45 may continue to partition a bounding volume 77 so long as it contains more than a predetermined leaf node threshold of primitives. For example, one embodiment may use a threshold of two primitives. Accordingly, the ADS construction algorithm 45 may stop partitioning a bounding volume 90 that contains less than or equal to the number of primitives associated with the threshold. Such a node 144 comprises a leaf node because it is not further sub-divided.

The resulting kd-tree or other spatial index structure may be stored in the shared memory cache 24. The kd-tree and the size of corresponding data that comprises the kd-tree may be optimized for storage in the shared memory cache 24. Although FIG. 3 shows an ADS 120 corresponding to a three-dimensional environment 50, another kd-tree embodiment consistent with the invention may correspond to a two dimensional scene to be rendered by the image processing system.

With collective reference to FIGS. 1-3, the system 10 of one embodiment may follow a pattern of issuing rays starting from the top of the pixel plane 58 and continue issuing rays, one ray per pixel, moving down the grid of pixels until a ray has been issued for each pixel in the plane 58. Multiple rays may ultimately issue through select pixels.

The workload manager 14 may perform operations related to the traversal of the rays 56 through the ADS 120. For instance, the workload manager 14 may traverse the ray through the ADS 120 by taking branches to nodes 122, 126, 128 defining bounding volumes 68, 72, 74 intersected by the ray 56 until a leaf node 150 is reached. Put another way, the workload manager 14 may use the coordinates and trajectory of an issued ray 56 to determine if it intersects bounding volumes 68, 72, 74 defined by the nodes 122, 126, 128 in the ADS 120. The workload manager 14 may continue traversing the ADS 120 until the ray 56 intersects a bounding volume 96 that contains only primitives (i.e., a leaf node). After traversing the ray 56 to a leaf node 150, the workload manager 14 may send information defining the ray 56 and an intersected pixel 64, as well as information defining an intersected node 124 to a vector throughput engine 18.

After the workload manager 14 sends the ray information to a vector throughput engine 18, it may begin traversing another ray 56 through the ADS 120. Thus, the workload manager 14 may continuously traverse rays 56 through the ADS 120 while the vector throughput engines 16, 17, 18, 19, 20, 21 are determining if rays 56 intersect an object 52 within the environment 50. That is, the vector throughput engines 16, 17, 18, 19, 20, 21 may perform ray-primitive intersection tests after they have received the information defining the ray 56 and the bounding volume. The vector throughput engines 16, 17, 18, 19, 20, 21 may determine the color of the object 52 at the point where it is intersected by the ray 56. After determining the color of the object at the intersection point, the vector throughput engine 16 may update the color of the pixel 60 through which the ray 56 passed. For example, the vector throughput engine 16 may write to a frame buffer memory location that corresponds to the pixel 60.

The vector throughput engines 16, 17, 18, 19, 20, 21 may generate secondary rays. For example, a vector throughput engine 16 may generate a reflected ray and a transmitted/refracted ray. Both secondary rays may originate from a point where an original ray 56 intersected the object 52. As described herein, the secondary rays may be used to determine additional color contribution to the object 52 at the point where the ray 56 intersected the object 52. The generation of such secondary rays may include determining a trajectory for each and tagging them such that the additional color contribution from the secondary ray may be used to update the color of the pixel 60 through which the original ray 60 passed. The vector throughput engine 16 may use an inbox 22 to send information defining a secondary ray to a workload manager 14. The workload manager 14 that receives the secondary ray information may use trajectory and other information to traverse the ADS 120.

Figure 4:
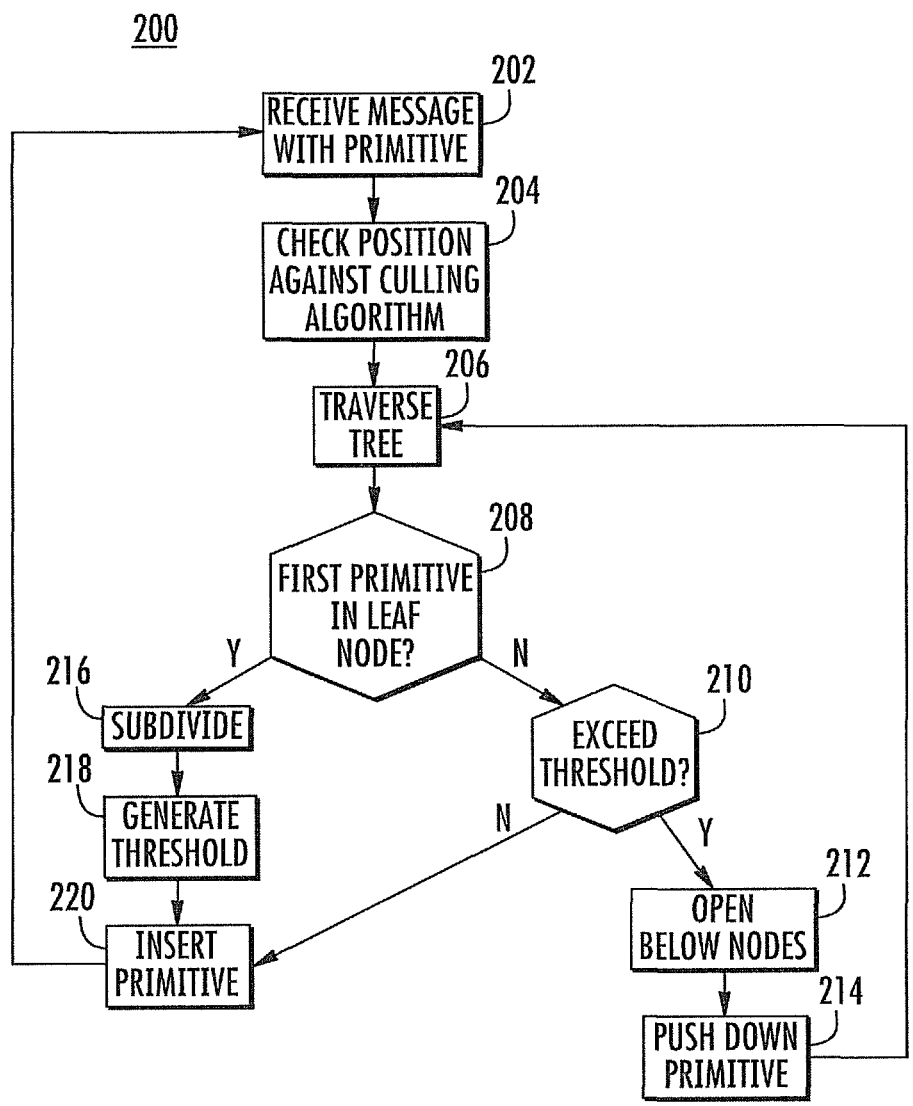
FIG. 4 is a flowchart having steps executable by processes of the system of FIG. 1 for constructing an ADS based upon a distance of a primitive and/or bounding volume from a reference in accordance with the underlying principles of the present invention.

FIG. 4 is a flowchart 200 having steps executable by processes of the system 10 of FIG. 1 for constructing an ADS 120 according to determined distances between bounding volumes and a reference. In one embodiment, the computational requirement associated with image rendering may be reduced in response to the efficient, distance-based construction. More particularly, processes of the flowchart 200 may build an efficiently balanced ADS 120 or other tree structure based on view frustum and distance culling. Ray tracing operations may reduce the rendering compute requirement by varying the size of bounding volumes into which image data is divided. Another or the same embodiment may vary a number of primitives included within nodes of an acceleration data structure that correspond to the bounding volumes.

Turning more specifically to the flowchart 200, the system 10 may receive at block 202 a message with a primitive. At block 204, the system 10 may check the position of the primitive and/or its associated bounding volume against the culling algorithm 41. For example, the system 10 may determine if the primitive is positioned outside of the frustum 57. Embodiments may begin to traverse the ADS 120 tree structure at block 206 as described herein.

The system 10 may determine at block 208 that the primitive is the first primitive to be in a given leaf node corresponding to the bounding volume of the primitive. If not, the system 10 may determine at block 210 if the leaf node threshold has been exceeded. The leaf node threshold may determine the number of primitives allowed in each leaf node.

Should the leaf node threshold be exceeded at block 210, then an embodiment may open below nodes and respectively push the primitive down at blocks 212 and 214. The system 10 may continue traversing the tree or other ADS 120 at block 206. Where the leaf node threshold is alternatively not exceeded at block 210, then the primitive may be inserted at block 220 into the node.

Where the primitive is the first one in the leaf node at block 208, the system may subdivide the node at block 216. A new leaf node threshold may be generated at block 218. This new threshold may cause primitives having a common distance from the reference to occupy a similar tier of the ADS 120. At block 220, the primitive may be inserted into the node of the ADS 120.

Aspects of the invention may rebuild a tree structure every frame to allow frame-to-frame optimization of leaf nodes in a highly threaded network on a chip processor. By following the steps of the flowchart 200, the amount of geometry in each leaf node may be based on a spatial distance from a reference point. For instance, the number of primitives in the nodes may depend upon their distance from the center 59 of the view frustum 57 to outlying bounding volumes. Processes may determine the geometry in a node based upon if the primitives lie outside of the view frustum and are only needed for reflected rays and shadows.

By adjusting the size of nodes and number of primitives per node, embodiments may modify the size of the corresponding bounding volumes. That is, the bounding volumes may increase by some function the farther they are away from the view frustum 57 or the ray origin 54. The bounding volume size and/or number of primitives per node may also be weighted based on past performance. In terms of the flowchart 200 of FIG. 4, such weighting may occur at block 218, for instance. The above size and/or number may also be determined by the number of rays shot in the bounding volume direction. The size of bounding volumes may be determined using load balancing processes based upon the amount of available computing resources. Past data and heuristics may be used to direct primitives most efficiently to appropriate bounding volumes and associated nodes. Historical data associated with ray intersections with leaf nodes may be used to determine the number of primitives per node. Such historical intersection data may alternatively or additionally be used to subdivide leaf nodes.

While the present invention has been illustrated by a description of various embodiments and while these embodiments have been described in considerable detail, it is not the intention of the Applicants to restrict, or, in any way limit the scope of the appended claims to such detail. For instance, embodiments may generate a bounding volume with a size that is inversely proportional to the distance of the bounding volume to the reference. Another or the same embodiment may direct the number of primitives allowed in a node to be inversely proportional to the distance of the corresponding bounding volume to the reference. The invention in its broader aspects is therefore not limited to the specific details, representative apparatus and method, and illustrative example shown and described. Accordingly, departure may be made from such details without departing from the spirit or scope of Applicants' general inventive concept.

What is claimed is:

1. A method of using a bounding volume hierarchy for ray tracing comprising:
   determining, at a computing device, a distance between a bounding volume of a plurality of bounding volumes and a reference, wherein the plurality of bounding volumes comprises divided portions of image data, and wherein a data structure includes a plurality of nodes corresponding to the plurality of bounding volumes;
   setting, according to the distance, a leaf node threshold for a node corresponding to the bounding volume, wherein the leaf node threshold is a number of primitives to be stored in the node before subdividing; and
   modifying a size of the bounding volume based at least in part on the distance and based at least in part on determining that a number of primitives to be placed in the node corresponding to the bounding volume exceeds the leaf node threshold.

2. The method of claim 1 further comprising rendering the image data using the data structure.

3. The method of claim 1, wherein the size is proportional to the distance.

4. The method of claim 1, wherein modifying the size of the bounding volume further comprises:
   in response to determining that the number of primitives to be placed in the node exceeds the leaf node threshold, creating a leaf node; and
   placing one or more of the primitives of the node into the leaf node.

5. The method of claim 1, wherein modifying the size of the bounding volume further comprises subdividing the node corresponding to the bounding volume.

6. The method of claim 5, wherein modifying the size of the bounding volume is based at least in part on an amount of space in the bounding volume.

7. The method of claim 1, wherein the reference includes a point in the image data, a ray origin, a frustum, or a combination thereof.

8. The method of claim 1, further comprising:
   determining a second distance between a second bounding volume of a second plurality of bounding volumes and a second reference, wherein the second plurality of bounding volumes comprises second divided portions of another frame of the image data;
   setting, according to the second distance, a second leaf node threshold for a second node corresponding to the second bounding volume; and
   modifying a second size of the second bounding volume based at least in part on determining that a second number of primitives to be placed in the second node corresponding to the second bounding volume exceeds the second leaf node threshold.

9. The method of claim 4, further comprising determining a second leaf node threshold for the leaf node corresponding to the bounding volume.

10. The method of claim 1, wherein modifying the size of the bounding volume is based at least in part on determining the number of primitives to be placed in the node according to historical performance data.

11. The method of claim 1, further comprising determining the number of primitives to be placed in the node corresponding to the bounding volume based on historical data concerning ray intersections of primitives within the node.

12. The method of claim 1, further comprising subdividing a leaf node corresponding to the bounding volume based on historical data concerning ray intersections.

13. The method of claim 1, further comprising:
   determining that a primitive to be placed in the node corresponding to the bounding volume is used for a secondary ray; and
   excluding the primitive from the node corresponding to the bounding volume based upon the determination.

14. The method of claim 1, wherein modifying the size of the bounding volume is based at least in part on determining a number of rays directed into the bounding volume.

15. The method of claim 1, further comprising load balancing the plurality of bounding volumes according to an available processing resource.

16. The method of claim 1, wherein the computing device comprises a highly threaded network on a chip.

17. The method of claim 1, wherein modifying the size of the bounding volume based at least in part on the distance is performed using a heuristic algorithm.

18. A method of using a bounding volume hierarchy for ray tracing comprising:
   determining, at a computing device, a distance between a bounding volume of a plurality of bounding volumes and a reference, wherein the plurality of bounding volumes comprises divided portions of image data, wherein a data structure includes a plurality of nodes corresponding to the plurality of bounding volumes, and wherein the reference is a point in the image data, a frustum, or a combination thereof, wherein the frustum represents a field of view, and wherein the reference excludes a ray origin;

setting, according to the distance, a leaf node threshold for a node corresponding to the bounding volume; and modifying a size of the bounding volume based at least in part on determining that a number of primitives to be placed in the node corresponding to the bounding volume exceeds the leaf node threshold.

19. The method of claim 18, wherein determining the distance further comprises determining a distance between the reference and an object included within the bounding volume.

20. The method of claim 18, further comprising determining the number of primitives to be placed in the node based on historical data concerning ray intersections of one or more primitives within the node.

21. The method of claim 18, wherein modifying the size of the bounding volume comprises:

in response to determining that the number of primitives to be placed in the node exceeds the leaf node threshold, creating a leaf node; and placing one or more of the primitives of the node into the leaf node.

22. The method of claim 18, wherein modifying the size of the bounding volume is based at least in part on determining the number of primitives to be placed in the node according to historical performance data.

23. An apparatus comprising:

a memory configured to:
  store image data logically divided into a plurality of bounding volumes for ray tracing; and
  store a data structure including nodes that correspond to the plurality of bounding volumes; and a processor coupled with the memory and configured to:
  determine a distance between each bounding volume of the plurality of bounding volumes and a reference; and
  modify a size of each bounding volume based on the distance, wherein modifying the size of the bounding volume comprises generating the plurality of bounding volumes with sizes that increase proportionally at a constant ratio with respect to the distance.

24. An apparatus comprising:

a memory configured to:
  store image data logically divided into a plurality of bounding volumes for ray tracing; and
  store a data structure including nodes that correspond to the plurality of bounding volumes; and a processor coupled with the memory and configured to:
  determine a distance between a bounding volume of the plurality of bounding volumes and a reference;
  set, according to the distance, a leaf node threshold for a node corresponding to the bounding volume, wherein the leaf node threshold is a number of primitives to be stored in the node before subdividing; and
  modify a size of the bounding volume based at least in part on determining that a number of primitives placed into the node corresponding to the bounding volume exceeds the leaf node threshold.

25. A program product comprising a computer-readable storage device including program code configured to:

determine a distance between a bounding volume of a plurality of bounding volumes and a reference, wherein the plurality of bounding volumes includes divided portions of image data and is used for ray tracing;

set, according to the distance, a leaf node threshold for a node corresponding to the bounding volume, wherein the leaf node threshold is a number of primitives to be stored in the node before subdividing; and modify a size of the bounding volume based at least in part on determining that a number of primitives to be placed in the node corresponding to the bounding volume exceeds the leaf node threshold.

* * * * *